US007555164B2

(12) United States Patent
Lin

(10) Patent No.: US 7,555,164 B2
(45) Date of Patent: Jun. 30, 2009

(54) ROBUST ESTIMATION OF PIXEL VALUES

(75) Inventor: I-Jong Lin, El Granada, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 874 days.

(21) Appl. No.: 11/021,754

(22) Filed: Dec. 23, 2004

(65) Prior Publication Data

US 2006/0139362 A1 Jun. 29, 2006

(51) Int. Cl.
*G06K 9/68* (2006.01)

(52) U.S. Cl. ...................................... 382/221; 345/581

(58) Field of Classification Search ................ 382/221; 345/581

See application file for complete search history.

(56) References Cited

U.S. PATENT DOCUMENTS 5,138,304 A 8/1992 Bronson
5,528,263 A * 6/1996 Platzker et al. .............. 345/156
6,388,654 B1 * 5/2002 Platzker et al. .............. 345/156
6,542,087 B2 4/2003 Lin
6,731,330 B2 5/2004 Lin

* cited by examiner

*Primary Examiner*—Vikkram Bali
*Assistant Examiner*—Eueng-Nan Yeh

(57) ABSTRACT

An exemplary method for estimating pixel values of displayed images captured by an image capture device comprises determining a status of a pixel of a displayed image based on a confidence value for the pixel and a comparison of an estimated value and a direct sampling value of the pixel, determining whether the pixel is obstructed based at least in part on the status and the confidence value, determining whether to update a pixel value of the pixel based at least in part on the status and whether the pixel is obstructed, repeating the determining steps for other pixels of the displayed image.

18 Claims, 9 Drawing Sheets

100
120
130
Displayed Image
140
150
110
Confidence Analyzer Module 230
Pixel Value Update Module 240
Confidence Value
(Updated) Estimated Pixel Value
Confidence Value
Direct Sampling Pixel Value
Pixel Status Estimator Module 210
Status
Obstruction Analyzer Module 220
Obstruction Analysis Result

ROBUST ESTIMATION OF PIXEL VALUES

BACKGROUND

Computer controlled projection systems generally include a computing device for generating (and/or storing) image data and a projector for projecting the image data onto a projection screen viewable by an audience. A presenter using the computer controlled projection system may direct the audience's attention to certain areas of a displayed image via a pointing device (e.g., finger, laser pointer, etc). In order for a presenter to make changes to the displayed images, the presenter generally interacts with the computing device via an input device such as a mouse, keyboard or remote device.

A variation of the above system allows a presenter to directly interact with displayed images. In addition to the computing device and projector, this system also includes an image capture device (e.g., a digital camera) for capturing the displayed images. The captured data of the displayed image may be transmitted back to the computing device to be used by the computing device, for example, to determine the pixel values of the captured image(s).

These types of processes are used in applications where the screen is being used as a life-size touch-screen display. In such applications, when the user places a finger or hand over a portion of the screen, that action is captured and used to control the computing device just as if the user had used a mouse to click on a portion of a conventional monitor.

In image capture systems, typically, an initial processing is performed to enable the computing device to determine the image display area within the overall captured area of the image capture device. After determining the image display area, the computing device may be able to estimate values of pixels of the captured displayed images.

However, existing systems are unable to obtain robust estimates of pixel values of a displayed image if a presenter obstructs (e.g., by standing in front of) the display area), or some other obstruction blocks the displayed images.

Thus, a market exists for a process that can provide robust pixel value estimates of a displayed image even when there is an obstruction.

SUMMARY

An exemplary method for estimating pixel values of displayed images captured by an image capture device comprises determining a status of a pixel of a displayed image based on a confidence value for the pixel and a comparison of an estimated value and a direct sampling value of the pixel, determining whether the pixel is obstructed based at least in part on the status and the confidence value, determining whether to update a pixel value of the pixel based at least in part on the status and whether the pixel is obstructed, and repeating the same process for each pixel of the displayed image.

Other embodiments and implementations are also described below.

DETAILED DESCRIPTION

I. Overview

Exemplary systems and methods for estimating pixel values of displayed images captured by an image capture device are described herein.

Section II describes an exemplary computing environment for capturing images being displayed on a display.

Section III describes an exemplary system for estimating pixel values of captured displayed images.

Section IV describes exemplary processes for estimating values of pixels on the captured displayed images.

Section V describes an exemplary mathematical description of the exemplary processes of Section IV.

II. An Exemplary Computing Environment

Figure 1:
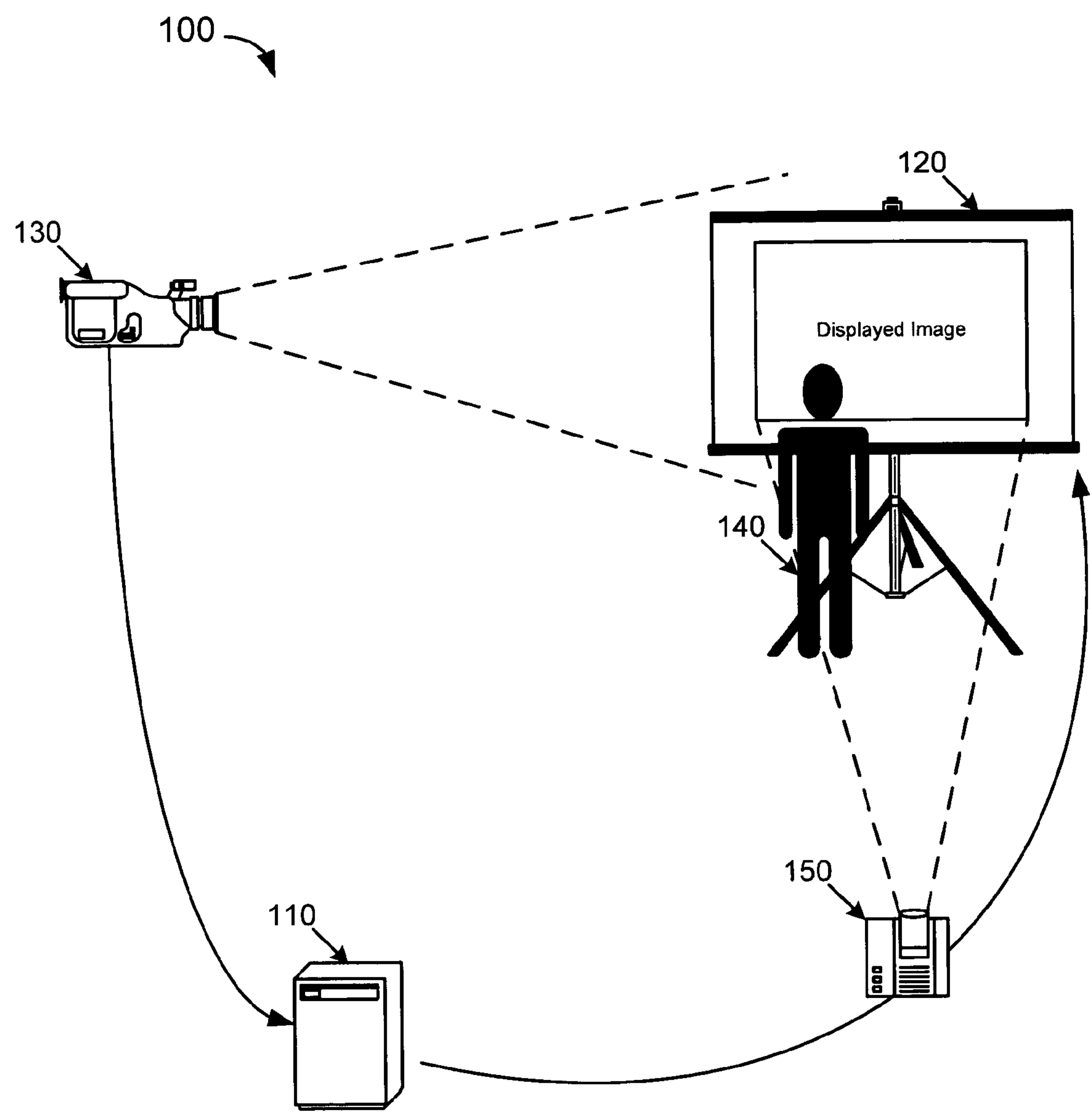
FIG. 1 illustrates an exemplary computing environment for capturing images displayed on a display.

FIG. 1 illustrates an exemplary computing environment 100 for capturing images displayed on a display 120 by an image capture device 130. The computing environment 100 also includes a computing device 110 which may be a workstation, personal computer, a laptop, a handheld computing device, or other computing devices usable for creating, processing, and/or storing the images to be displayed on the display 120. The display 120 may be a physical display (e.g., a projection screen as illustrated in FIG. 1, receiving an image projected from projector 150), an electronic display (e.g., a computer monitor receiving a signal directly from computing device 110 in the absence of projector 150), or any other computer controllable display (e.g., LCD, CRT, organic LED, etc.).

In an exemplary implementation, images captured by the image capture device 130 are sent to the computing device 110. The computing device 110 can calculate an initial estimated value for each pixel on the displayed image based on direct sampling data and/or calibrated data, both of which are described in greater detail below. For example, an initial estimated value for a given pixel may be some sort of weighted average of the direct sampling data and calibrated data for that pixel.

Direct sampling data may be obtained directly from the captured images. This technique is accurate so long as the line of sight between the image capture device 130 and the display 120 is unobstructed. Direct sampling may be inaccurate if the displayed image is obstructed by an object (e.g., a human 140). In general, direct sampling data change over time corresponding to an output of the image capture device 130.

Calibration data may be calculated by the computing device 110 based on calibration processes applied to known source data (i.e., a data signal sent to or at the projector in the case of a projection screen, or a data signal at the video driver in the case of a computer monitor). In general, the images at the display will not exactly match the source images due to geometrical and optical factors such as variations in ambient lighting, warping of the projection screen, nonconformities in the projector lens, etc. The displayed images may be captured and compared to corresponding source images to determine a transformation function. Once the transformation function is determined, one can indirectly estimate pixel values of any other displayed image (as captured by the image capture device) by applying the function to the known source data corresponding to the displayed image. Techniques for calculating such transformation functions are well known in the art and need not be described in detail herein.

III. An Exemplary System for Robustly Estimating Pixel Values of Captured Displayed Images FIG. 2 illustrates an exemplary system for estimating pixel values of captured displayed images even when the displayed images are partially obstructed (e.g., by a presenter 140), either intentionally (e.g., when using the display as a touch screen application) or unintentionally (e.g., when standing between the projector and the screen).

Figure 2:
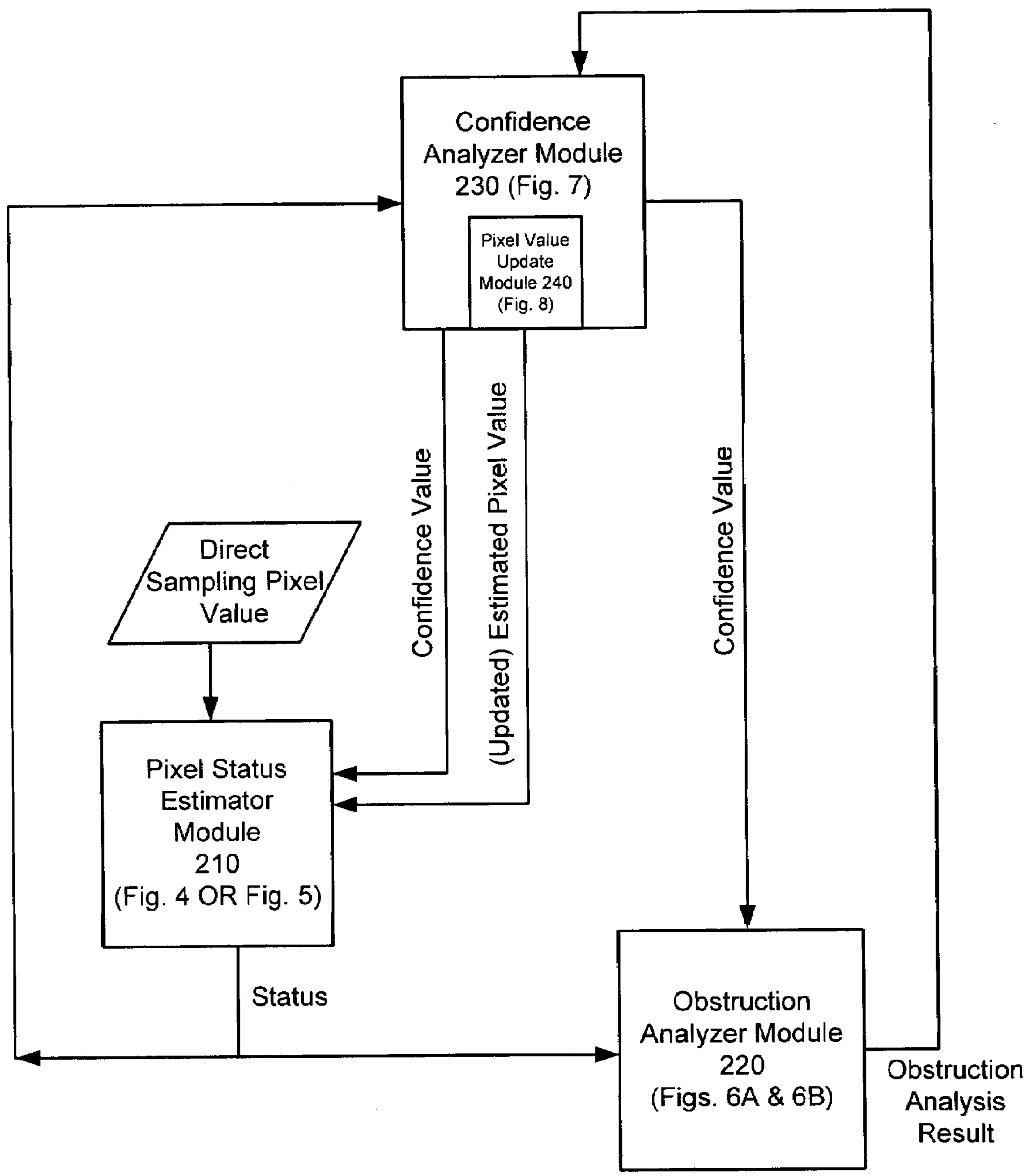
FIG. 2 illustrates an exemplary system for estimating pixel values of images displayed on a display.

The system of FIG. 2 includes a pixel status estimator module 210, an obstruction analyzer module 220, and a confidence analyzer module 230, including a pixel value update module 240. In an exemplary implementation, one or more of these modules may be implemented in software, hardware, firmware or any combination thereof. Furthermore, one or more of these modules may reside in the computing device 110, on multiple computing devices in a distributed computing environment, or on a remote computing device (not shown) accessible to the computing device 110 via a network (not shown).

During initialization of a pixel estimation process, the pixel status estimator module 210 obtains an estimated value and a direct sampling value for each pixel of a displayed image. In an exemplary implementation, an estimated value may be determined by calculating a weighted average between a calibrated value and a direct sampling value of each given pixel. The weighted average could be applied on a 0:1 basis (pure direct sampling value), a 1:0 basis (pure calibrated value), or anywhere in between, with a 1:1 basis (i.e., arithmetic mean of the two) being a typical exemplary choice. One skilled in the art will recognize that other functions for determining an estimated value may be applicable as well depending on a particular implementation. An exemplary initialization process, illustrated in FIG. 4, will be described in more detail in Section IV below.

The pixel status estimator module 210 compares the estimated value and the direct sampling value for each pixel to determine a status of each pixel. In an exemplary implementation, the pixel status estimator module 210 also obtains a confidence value of each pixel from the confidence analyzer module 230 when determining the status of the pixel. The status of a pixel indicates whether the pixel's estimated value is a robust estimation. The pixel status from the pixel status estimator module 210 is input into the obstruction analyzer module 220 for determining whether that pixel is currently obstructed by an object. In addition, the pixel status is input into the confidence analyzer 230 for updating the confidence value relating to that pixel. An exemplary iterative pixel status updating process, illustrated in FIG. 5, will be described in more detail in Section IV below.

The confidence value of a pixel indicates the system's confidence regarding the accuracy of the estimated value of that pixel. For example, the confidence value may indicate or reflect a length of time that a given pixel has maintained its estimated value. In this example, if the length of time is longer than a threshold period, then the system may have high confidence that the pixel's existing estimated value is accurate. On the other hand, if the length of time is shorter than a threshold period, then the system may have low confidence that the pixel's existing estimated value is accurate.

The obstruction analyzer module 220 receives two inputs: the pixel's status from the pixel status estimator module 210; and the pixel's confidence value from the confidence analyzer module 230. The obstruction analyzer module 220 performs an obstruction analysis for the pixel based on the input values and the obstruction analyzer's own logic rules to determine whether the pixel is currently obstructed. An exemplary logic rule is based on the assumption that an obstruction on a displayed image should not float in mid-air without some kind of support coming from at least one edge of the displayed image. For example, a finger causing an obstruction on the displayed image is supported by an arm, the arm is supported by a shoulder, etc. Thus, when a pixel is truly obstructed, one should be able to find a path of obstructed pixels from that pixel to an edge of the displayed image. An exemplary obstruction analysis process, illustrated in FIG. 6, will be described in more detail in Section IV below.

The confidence analyzer module 230 obtains two inputs for each pixel for updating a confidence value for the pixel: a status of the pixel from the pixel status estimator module 210; and obstruction information for the pixel from the obstruction analyzer module 220. The confidence analyzer module 230 determines whether to increase or decrease confidence in the accuracy of a pixel's estimated value based at least in part on the inputs. Details of an exemplary confidence analysis process, illustrated in FIG. 7, will be described in more detail in Section IV below.

In an exemplary implementation, the confidence analyzer module 230 includes a pixel value update module 240. One skilled in the art will recognize that the pixel value update module 240 could alternatively be implemented as an independent module, or as a part of one of the other modules. The pixel value update module 240 determines whether to update the existing value of a given pixel based at least in part on the status and obstruction analysis result relating to that pixel.

IV. Exemplary Processes for Estimating Pixel Values

Figure 3:
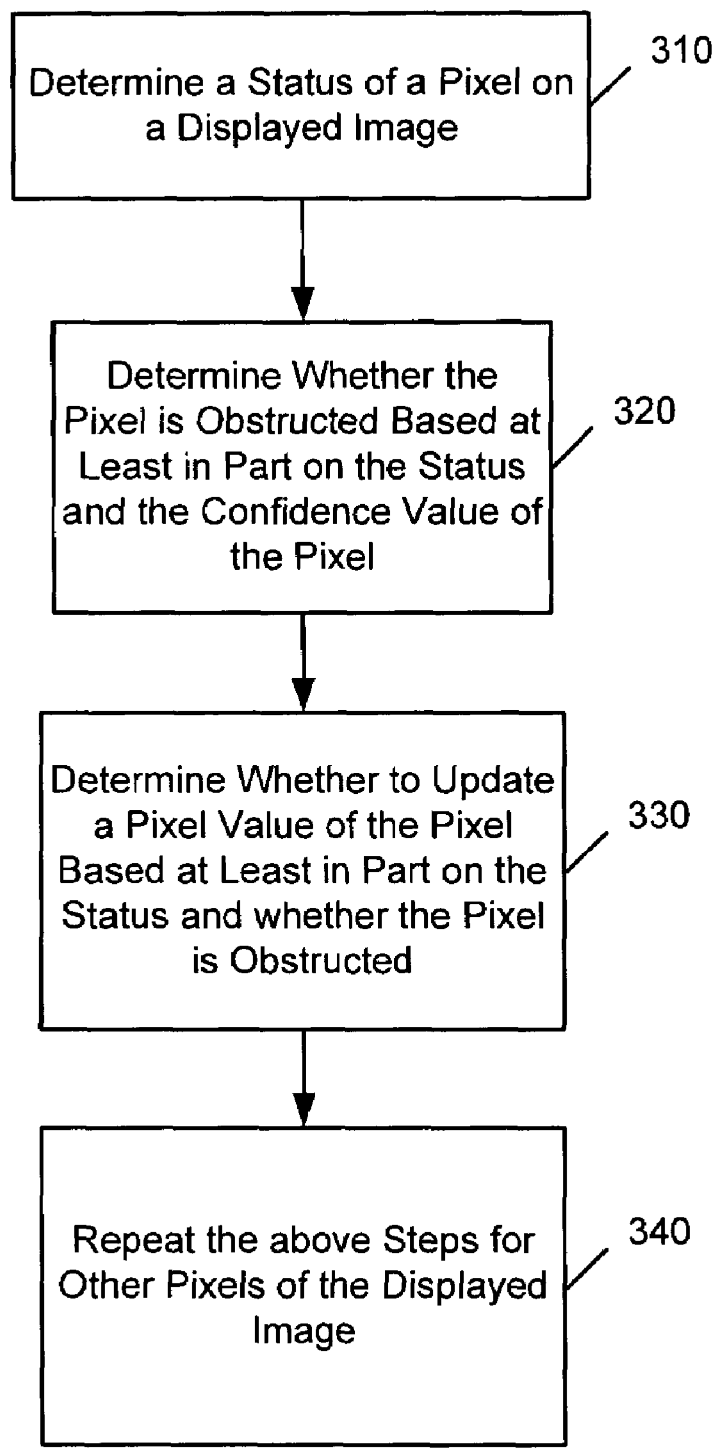
FIG. 3 illustrates an exemplary process for estimating pixel values of images displayed on a display.

FIG. 3 illustrates an overview of an exemplary process for robustly determining an estimated value for each pixel of a displayed image captured by an image capture device, corresponding to the system of FIG. 2.

At step 310, a status of a pixel is determined based on a confidence value of the pixel, and a comparison of an estimated value to a direct sampling value of the pixel. This will be described with reference to FIGS. 4 and 5 below.

At step 320, whether the pixel is obstructed by an object is determined based at least in part on the status determined at step 310 and the confidence value of the pixel. The obstruction determination will be described with reference to FIG. 6 below, and the confidence value determination will be described with reference to FIG. 7 below.

At step 330, whether the existing value of the pixel should be updated is determined. In an exemplary implementation, this determination is based at least in part on the status and whether the pixel is obstructed. For example, if the pixel is not obstructed, the existing pixel value may be set to equal to the direct sampling value of the pixel. This will be described with reference to FIG. 8 below.

At step 340, the process is repeated for other pixels of the displayed image.

The remainder of this Section will explain each of the aforementioned steps in greater detail.

A. Status Determination

Figure 4:
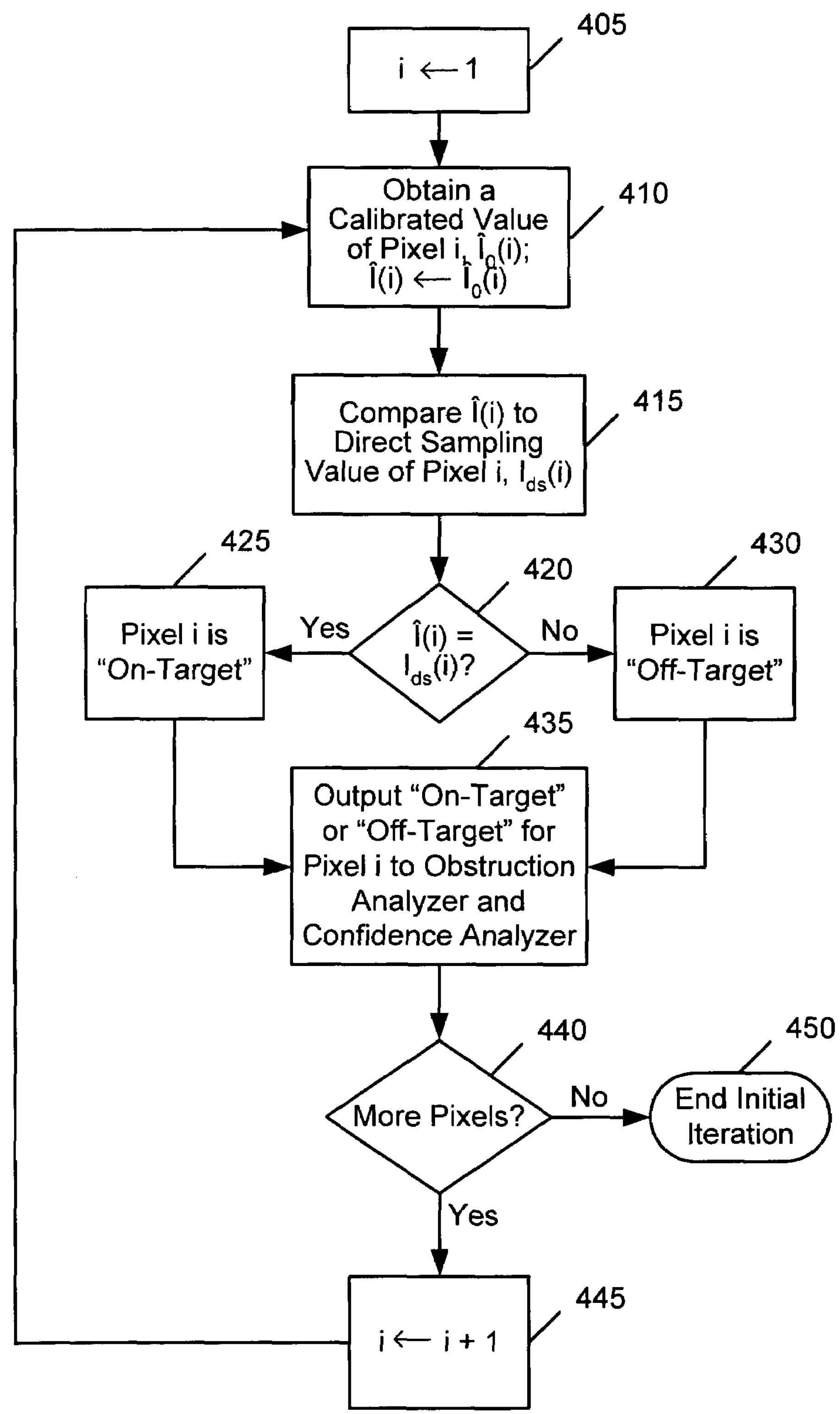
FIG. 4 illustrates an exemplary initialization process for determining a status for each pixel.
Figure 5:
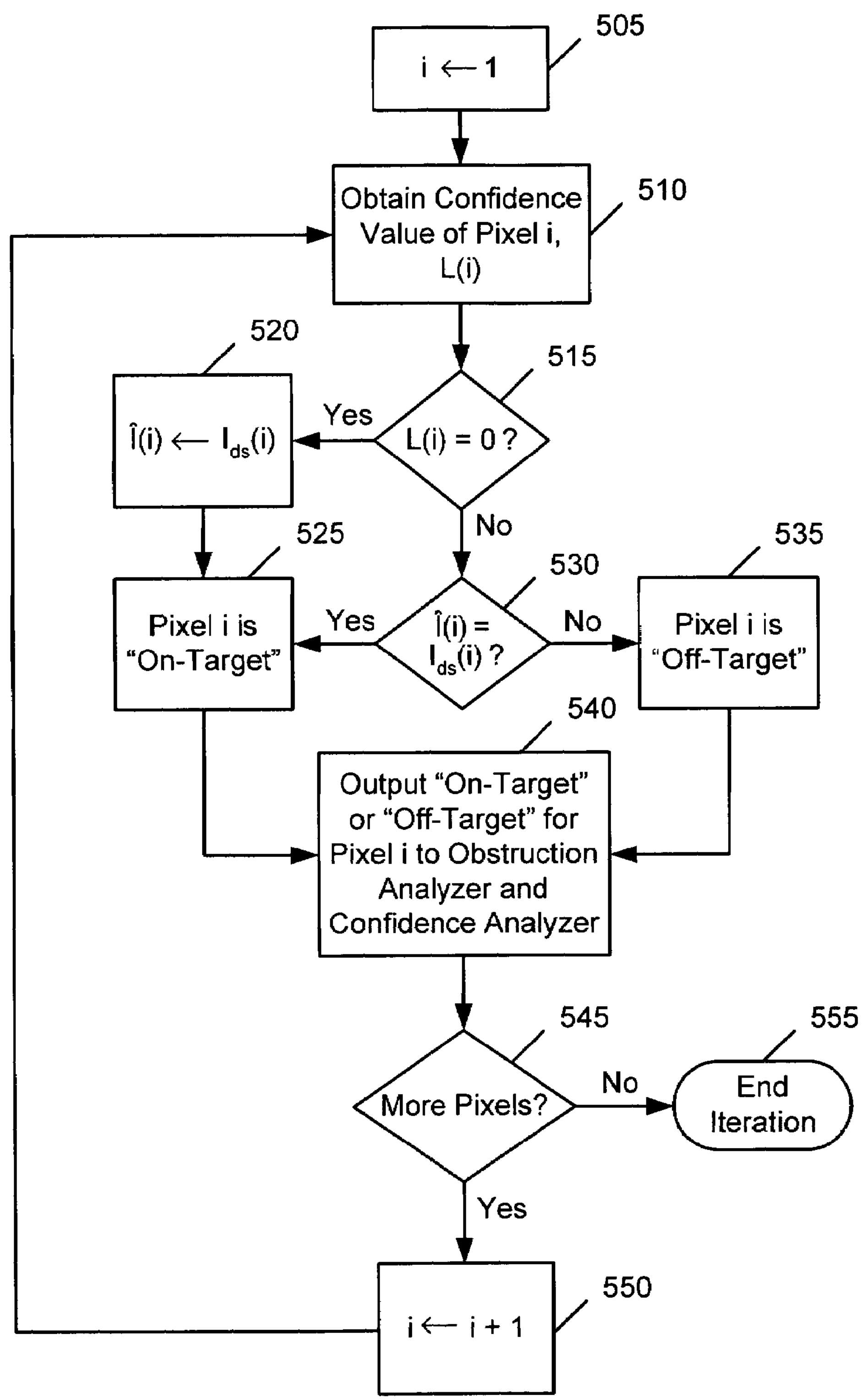
FIG. 5 illustrates an exemplary iterative process for determining and updating the status for each pixel after the initialization process.

Corresponding to step 310, FIG. 4 illustrates an exemplary initialization process for determining a status of each pixel of the displayed image captured by the image capture device. The process of FIG. 4 is executed the first time the status of the pixels of the image is determined; FIG. 5 below illustrates the process executed at each subsequent determination of pixel status. In an exemplary implementation, processes in FIGS. 4 and 5 are executed in the pixel status estimator module 210.

At step 405, the system is set for determining the status of the first pixel, i←1.

At step 410, a calibrated value $\hat{I}_0(i)$ of the pixel is obtained and an estimated pixel value of pixel i, $\hat{I}(i)$ is set to equal to $\hat{I}_0(i)$.

At steps 415-420, $\hat{I}(i)$ is compared to a direct sampling value $I_{ds}(i)$ of the pixel.

At step 425, if $\hat{I}(i)=I_{ds}(i)$, then the status of the pixel is "on-target."

At step 430, if $\hat{I}(i)$ does not equal to $I_{ds}(i)$, then the status of the pixel is "off-target."

At step 435, the status of pixel i is output, for example, to the obstruction analyzer module 220 and the confidence analyzer module 230.

At step 440, whether additional pixels remain to be processed is determined.

At step 445, if additional pixels remain to be processed, i is incremented by 1 and the status of the next pixel is determined by returning to step 410 and repeating the steps described above.

At step 450, if there are no more pixels to be processed, the process ends.

Corresponding to step 310, FIG. 5 illustrates an exemplary iterative process for updating the status of each pixel of the displayed image captured by the image capture device. The process of FIG. 5 is executed at each subsequent determination of pixel status following the first-time status determination of FIG. 4.

At step 505, the system is set for updating the status of the first pixel, i←1.

At step 510, a confidence value L(i) of pixel i is obtained, for example, from the confidence analyzer module 230.

At step 515, whether L(i) is equal to 0 is determined. L(i) equal to 0 indicates low confidence, i.e., low trust in the existing estimated pixel value, which should therefore be replaced.

If L(i) is equal to 0, at step 520, an estimated value $\hat{I}(i)$ of pixel i is reset to the direct sampling value $I_{ds}(i)$ of pixel i and, at step 525, the status of pixel i is set to "on-target."

If L(i) is not equal to 0, at step 530, whether the estimated value $\hat{I}(i)$ of pixel i is equal to the direct sampling value $I_{ds}(i)$ of pixel i is determined. During the first iteration after the initialization process described in FIG. 4 above, $\hat{I}(i)$ is equal to $I_{ds(i)}$.

If $\hat{I}(i)$ is equal to $I_{ds}(i)$, at step 525, the status of pixel i is "on-target."

If $\hat{I}(i)$ is not equal to $I_{ds}(i)$, at step 535, the status of pixel i is "off-target."

At step 540, the status of pixel i is output, for example, to the obstruction analyzer module 220 and the confidence analyzer module 230.

At step 545, whether additional pixels remain to be processed is determined.

At step 550, if additional pixels remain to be processed, i is incremented by 1 and the status of the next pixel is determined by returning to step 510 and repeating the steps described above.

At step 555, if there are no more pixels to be processed, the process ends.

B. Obstruction Determination

Figure 6A:
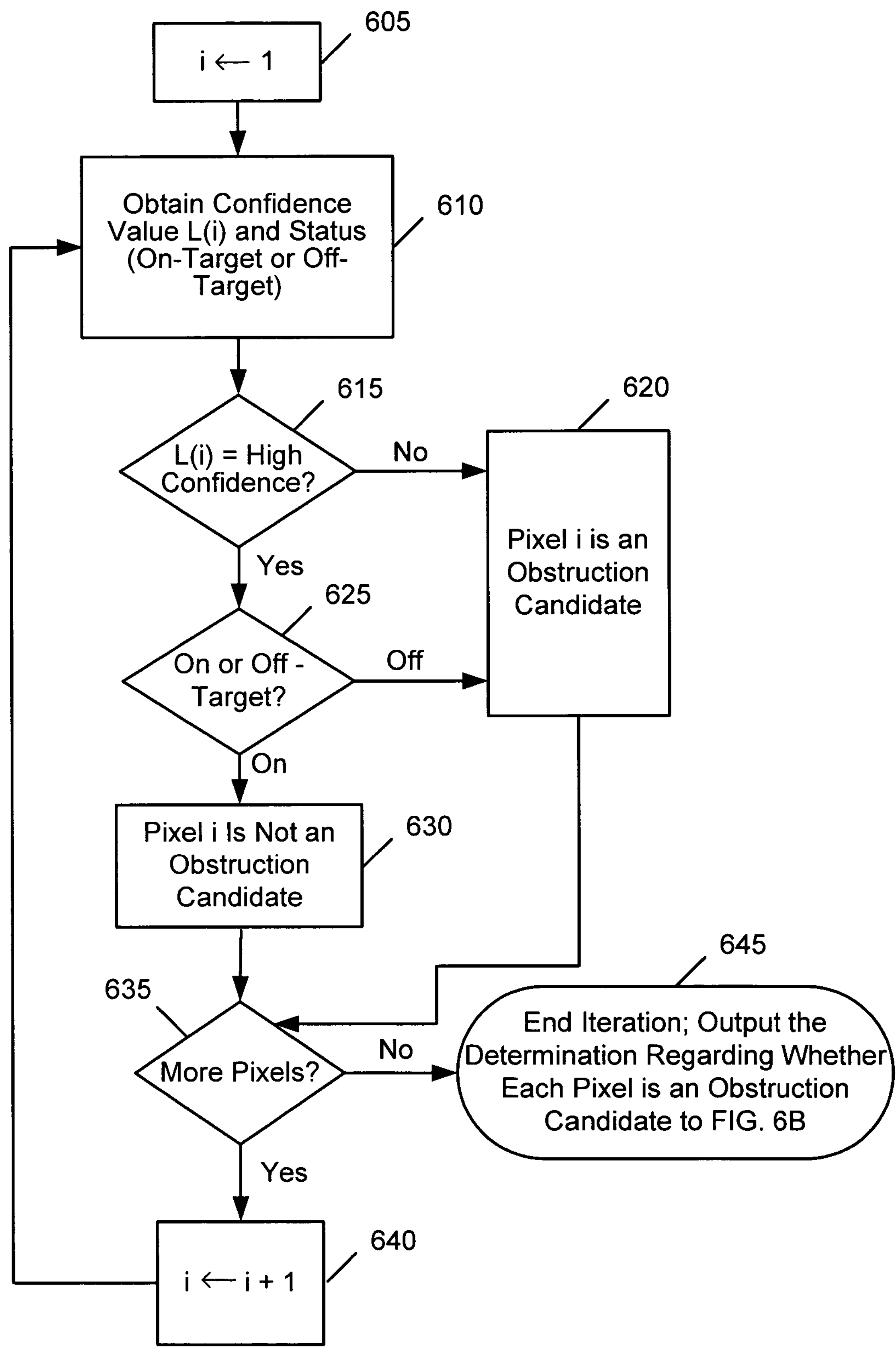
FIG. 6 illustrates an exemplary iterative process for performing obstruction analyses to determine whether each pixel is obstructed by an object.
Figure 6B:
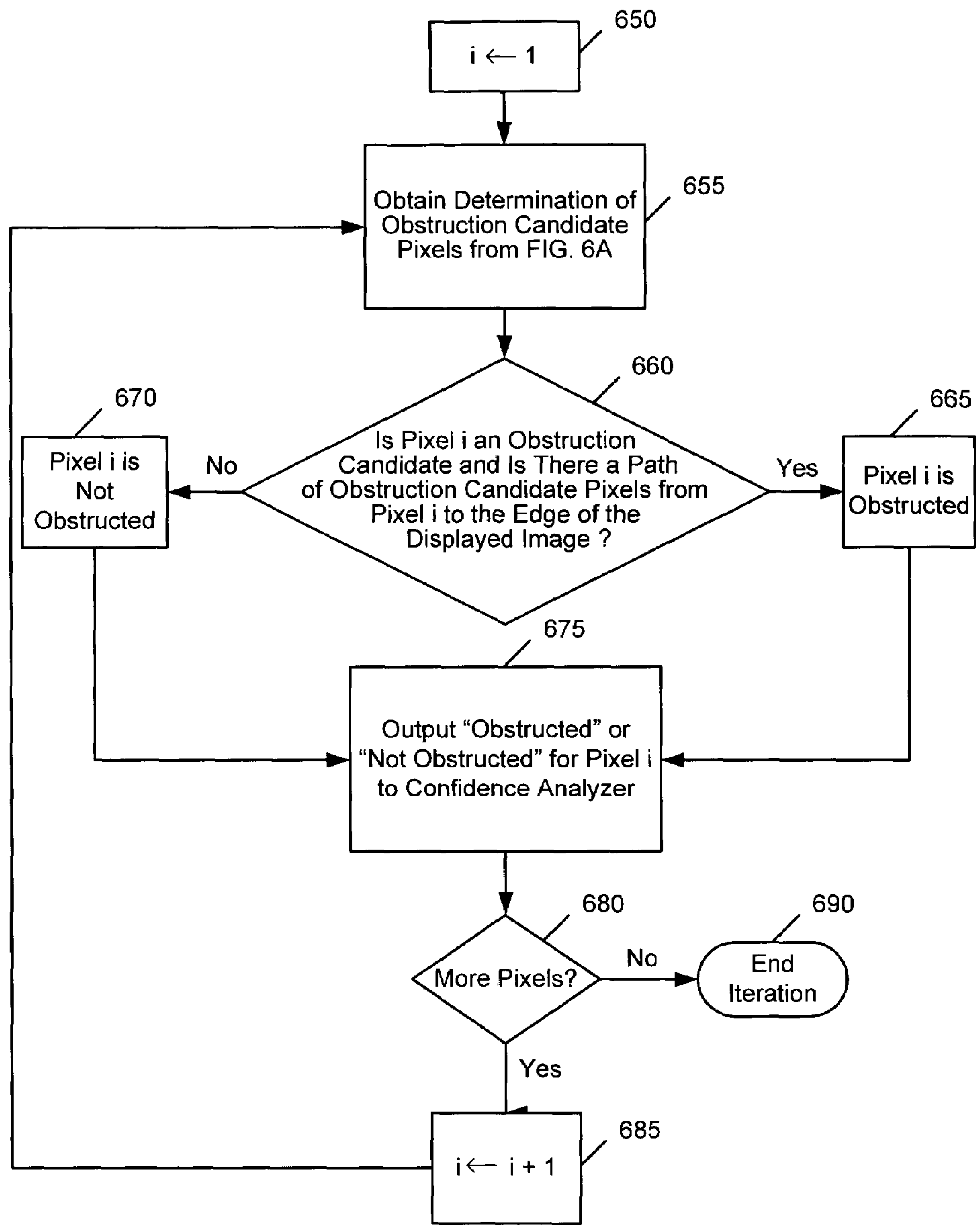

Corresponding to step 320, FIGS. 6A and 6B illustrate an exemplary obstruction analysis process for determining whether each pixel of the displayed image captured by the image capture device is obstructed.

At step 605, the system is set for determining whether the first pixel, i←1, should be considered a potentially obstructed pixel.

At step 610, the status (e.g., on or off target) and confidence value L(i) of pixel i are obtained, for example, from the pixel status estimator module 210 and the confidence analyzer module 230, respectively.

At step 615, whether L(i) indicates high confidence is determined. In an exemplary implementation, L(i) is compared to a threshold value which is predetermined to indicate high confidence to the estimated value of pixel i. For example, if the estimated value of pixel i has remained unchanged over a long period of time, then L(i) (which reflects the time) indicates high confidence. A person skilled in the art will recognize that a threshold value can be readily determined depending on the requirements of a particular implementation.

If L(i) does not indicate high confidence, then at step 620, pixel i is considered an obstruction candidate. Given only information associated with pixel i (but not information associated with any other pixels), an obstruction candidate pixel is a pixel that is considered potentially obstructed. The process then goes to step 635 for processing additional pixels.

If L(i) indicates high confidence, then at step 625 whether pixel i is on or off target is determined based on the obtained status.

If pixel i is off-target, then at step 620, pixel i is considered an obstruction candidate. The process then goes to step 635 for processing additional pixels.

If pixel i is on-target, then at step 630, pixel i is considered not an obstruction candidate. The process then continues at step 635 to determine whether additional pixels remain to be processed.

At step 640, if additional pixels remain to be processed, i is incremented by 1 and the process continues by returning to step 610 and repeating the steps described above.

At step 645, if there are no more pixels to be processed, the process ends and the determination of whether each pixel is an obstruction candidate is output to FIG. 6B. The obstruction state of each pixel in the set of obstructed pixels is further verified by the process in FIG. 6B.

In FIG. 6B, an iterative process is performed to determine the output of the obstruction analysis result of each pixel.

At step 650, the system is set for determining whether the output of the first pixel, i←1, should be deemed obstructed or not obstructed.

At step 655, the determination of obstruction candidate pixels is obtained from step 645 of FIG. 6A.

At step 660, a logic rule is applied. In an exemplary implementation, whether pixel i is an obstruction candidate and whether a path of obstruction candidate pixels exists from pixel i to the edge of the displayed image is determined.

Depending on the results of the applied logic rule, the pixel i is either deemed obstructed (665) or not obstructed (670) as an output of the obstruction analysis result.

At step 675, the obstruction analysis result for pixel i is output, for example, to the confidence analyzer module 230.

At step 680, whether additional pixels remain to be processed is determined.

At step 685, if additional pixels remain to be processed, i is incremented by 1 and the process continues by returning to step 655 and repeating the steps described above.

At step 690, if there are no more pixels to be processed, the process ends.

C. Confidence Value Determination

Figure 7:
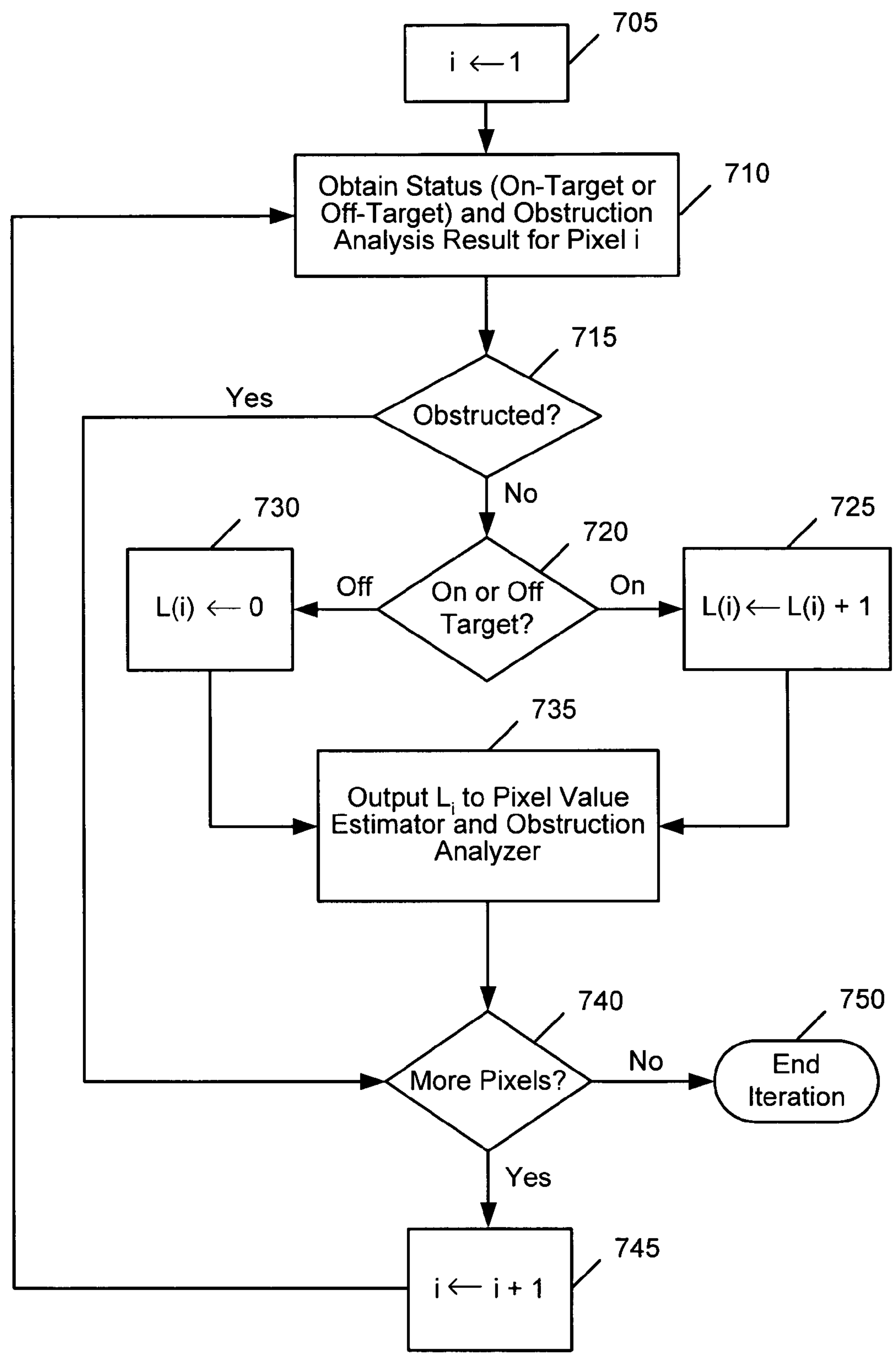
FIG. 7 illustrates an exemplary iterative process for performing confidence analyses for updating a confidence value for each pixel.

Various of the exemplary steps described herein use a confidence value. The first time the pixels of an image are processed, the confidence values are assumed to be zero, since the system has not yet tested the accuracy of the estimated pixel values. FIG. 7 illustrates an exemplary confidence analysis for determining a confidence value of each pixel of the displayed image captured by the image capture device, after the first round of processing.

At step 705, the system is set to determine (or update) a confidence value of the first pixel, i←1.

At step 710, the status (e.g., on or off target) and obstruction analysis result of pixel i are obtained, for example, from the pixel status estimator module 210 and the obstruction analysis module 220.

At step 715, whether pixel i is obstructed is determined based on the obstruction analysis result.

If pixel i is obstructed, the process continues at step 740 to determine whether any pixels remain to be processed.

If pixel i is not obstructed, at step 720, whether the value of pixel i is on or off target is determined based on the status of pixel i.

If pixel i is on-target, at step 725, the confidence value L(i) of pixel i is increased (e.g., incremented by 1).

If pixel i is off-target, at step 730, the confidence value L(i) of pixel i is decreased (e.g., set to equal to 0).

At step 735, the confidence value L(i) of pixel i is output, for example, to the pixel status estimator module 210 and the obstruction analyzer module 220.

At step 740, whether additional pixels remain to be processed is determined.

At step 745, if any pixels remain to be processed, i is incremented by 1 and the process continues by returning to step 710 and repeating the steps described above.

At step 750, if there are no more pixels to be processed, the process ends.

D. Updating Estimated Pixel Values

Figure 8:
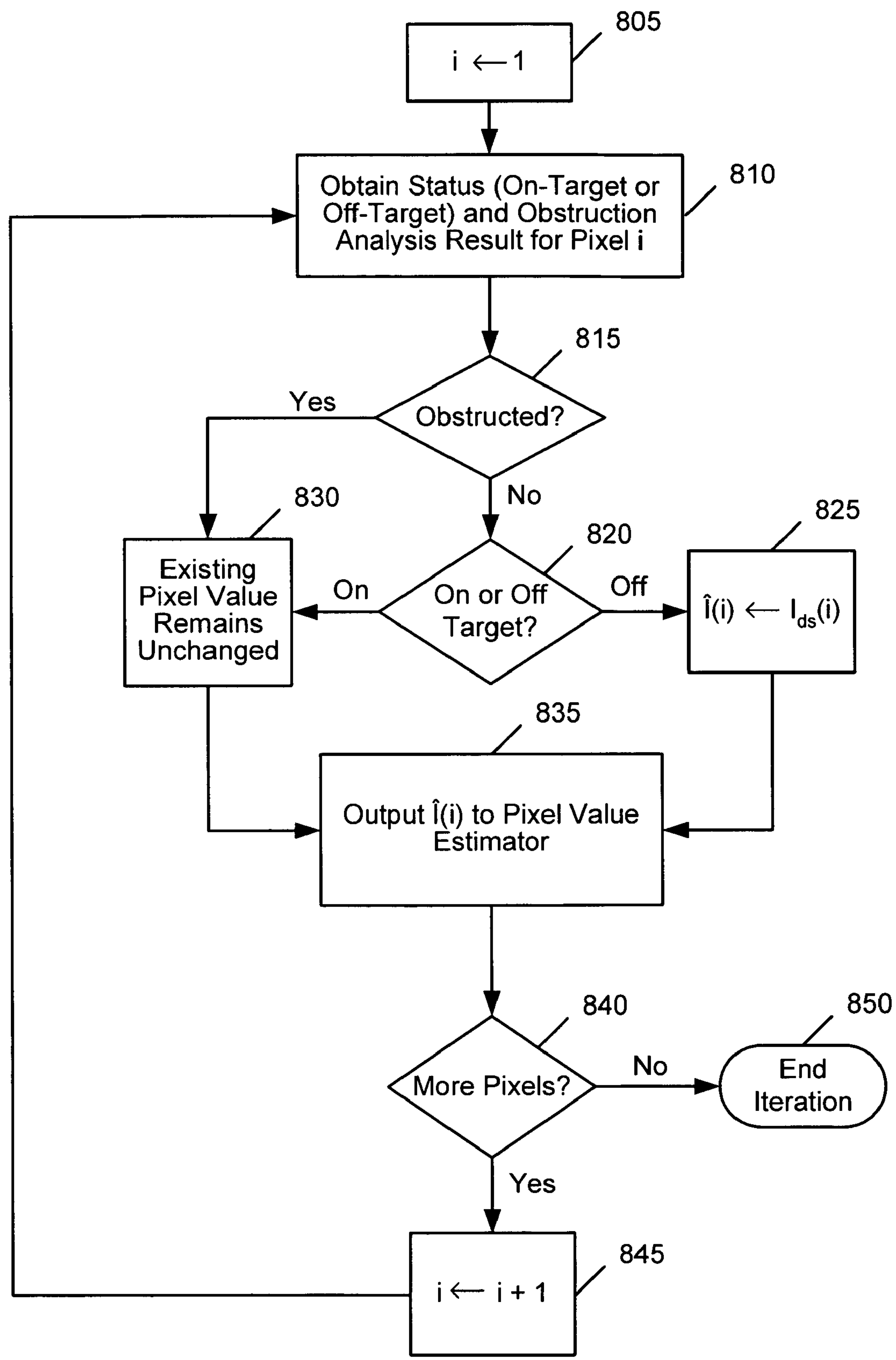
FIG. 8 illustrates an exemplary iterative process for determining whether to update an existing value of each pixel.

Corresponding to step 330, FIG. 8 illustrates an exemplary process for determining whether to update an estimated value of each pixel of the displayed image captured by the image capture device.

At step 805, the system is set to determine whether to update the value of the first pixel, i←1.

At step 810, the status and obstruction analysis result are obtained, for example, from the pixel status estimator module 210 and the obstruction analyzer module 220, respectively.

At step 815, whether pixel i is obstructed is determined.

If pixel i is obstructed, at step 830, the existing value of pixel i is not changed.

If pixel i is unobstructed, at step 820, whether pixel i is on or off target is determined based on the status of pixel i.

If pixel i is on-target, at step 830, the existing estimated value of pixel i is not changed.

If pixel i is off-target, at step 825, the existing estimated value $\hat{I}(i)$ of pixel i is replaced by the direct sampling value $I_{ds}(i)$ of pixel i.

At step 835, the estimated value $\hat{I}(i)$ of pixel i is output, for example, to the pixel status estimator module 210.

At step 840, whether additional pixels remain to be processed is determined.

At step 845, if additional pixels remain to be processed, i is incremented by 1 and the process continues by returning to step 810 and repeating the steps described above.

At step 850, if there are no more pixels to be processed, the process ends.

In another exemplary implementation, the exemplary process of FIG. 8 may be incorporated into the exemplary process of FIG. 7 by making the following adjustments. If pixel i is determined to be obstructed at step 715, the existing estimated value $\hat{I}(i)$ of pixel i is not changed and the process then continues at step 740. On the other hand, if pixel i is determined to be unobstructed and its status is off-target (steps 715 and 720), then the existing estimated value $\hat{I}(i)$ of pixel i is set to equal to $I_{ds}(i)$ before continuing at step 730. Lastly, if pixel i is determined to be unobstructed and its status is on-target (steps 715 and 720), then the existing estimated value of pixel i ($\hat{I}(i)$) is not changed and the process continues at step 730.

The processes illustrated above are merely exemplary. Those skilled in the art will appreciate that other processes and/or steps may be used in accordance with the requirements of a particular implementation.

V. An Exemplary Mathematical Description

This section describes an exemplary mathematical description of the exemplary processes described above.

Exemplary variables will be defined as follows for a given pixel (x, y) at time iteration t:

x, y, t are integers.

$I_{ds}(x, y, t)|t=t_0$ represents the direct sampling values of all pixels on a displayed image captured by an image capture device at time $t_0$.

$\hat{I}(x, y, t)$ represents the estimated values for all pixels on the displayed image.

T (x, y, t) represents the status (e.g., on- or off-target) for a given pixel (x, y) at time t $$T(x, y, t) = \begin{cases} 0, \text{ when pixel}(x, y) \text{ is off} - \text{target at time } t \\ 1, \text{ when pixel}(x, y) \text{ is on} - \text{target at time } t \end{cases}$$

L (x, y, t), represents the confidence value of a given pixel

L (x, y, t)=the amount of time the existing estimated pixel value has been accurate $t_L$, the minimum lifetime of a given pixel value that is considered to be accurate.

O (x, y, t) represents the obstruction state of a given pixel at time t.

$$O(x, y, t) = \begin{cases} 0, \text{ when pixel}(x, y) \text{ is unobstructed at time } t \\ 1, \text{ when pixel}(x, y) \text{ is obstructed at time } t \end{cases}$$

$\Phi$ represents the set of pixels of the displayed image captured by the image capture device.

$\Phi_E$ represents the subset of pixels located at the edges of the displayed image captured by the image capture device.

$\Phi_C(t)$ represents the subset of pixels of the displayed image captured by the image capture device that are considered obstruction candidate pixels.

$\Phi_O(t)$ represents the subset of pixels of the displayed image captured by the image capture device that are deemed obstructed.

At time $t_0=0$, we assume that $\Phi$ and $\Phi_E$ have been calculated by techniques known in the art. Likewise, the initial value of each pixel ($\hat{I}_0$) can be determined by applying calibration techniques known in the art. Thus, at time 0:

$$\hat{I}|_{t=0}=\hat{I}_0$$

$$L(x, y, 0)=t_L$$

$$O(x, y, t<0)=0$$

At time period t>0, the status of each pixel (e.g., on- or off-target) can be determined as follows:

$$T(x, y, t)=f_{diff}(I_{ds}(x, y, t')|_{t'<t}, \hat{I}(x, y, t)|_{t'<t})$$

where $f_{diff}$ compares the existing estimated pixel value ($\hat{\imath}$) with the direct sampling value ($I_{ds}$) for each pixel (x, y). An exemplary $f_{diff}$ function is:

$$f_{diff}(a(t), b(t)) = \begin{cases} 1, \text{ if } \|a(t)-b(t)\| \le \delta \\ 0, \text{ otherwise} \end{cases}$$

where δ is a threshold value. The estimated pixel value ($\hat{I}$) can be updated by:

$$\hat{I}(x, y, t) = \begin{cases} L(x, y, t) > 0, & \hat{I}(x, y, t-1) \\ L(x, y, t) = 0, & I_{ds}(x, y, t) \end{cases}$$

The set of obstruction candidate pixels $\Phi_C(t)$ can be defined as:

$$\Phi_C(t)=\{(x, y)\in\Phi|(L(x, y, t)<t_L)\vee(T(x, y, t)=0)\}$$

and the set of pixels that are deemed obstructed $\Phi_O(t)$ (i.e., after verifying the set of pixels that are considered obstruction candidates $\Phi_C(t)$) can be defined as:

$$\Phi_O(t) = \left\{ (x_0, y_0) \;\middle|\; \text{s.t. } \exists \begin{array}{l} (x_0, y_0), (x_1, y_1), (x_2, y_2), \ldots, (x_n, y_n) \\ 0 \le i \le (n-1), \|x_i - x_{(i+1)}\| + \|y_i - y_{(i+1)}\| \le 1 \\ 0 \le i \le n, (x_i, y_i) \in \Phi_C(t) \\ 0 \le i \le n, (x_i, y_i) \in \Phi \\ (x_n, y_n) \in \Phi_E \end{array} \right\}$$

which is a mathematical expression of the logic rule that each obstructed pixel should be a part of a path of obstructed pixels from that obstructed pixel to an edge of the displayed image. The exemplary $\Phi_O(t)$ above can be calculated by applying simple graph connectivity algorithms known in the art (e.g., depth first search, Dijkstra algorithm, etc.). O (x, y, t) can be updated as follows:

$$O(x, y, t) = \begin{cases} 1, (x, y) \in \Phi_O(t) \\ 0, (x, y) \notin \Phi_O(t) \end{cases}$$

The confidence value L (x, y, t) is updated as follows:

$$L(x, y, t)=f_{life}(T(x, y, t')|_{t'\leqq t}, O(x, y, t')|_{t'\leqq t}, L'), \text{ where } L'=L(x, y, t-1)$$

$f_{life}$ represents whether the current pixel value estimate is correct when accounting for the obstruction analysis result. For example, $f_{life}$ may be represented as follows:

$$f_{life}(a(t), b(t), 1) = \begin{cases} L', a(t) = 1 \wedge b(t) = 1 \\ L', a(t) = 0 \wedge b(t) = 1 \\ L' + 1, a(t) = 1 \wedge b(t) = 0 \\ 0, a(t) = 0 \wedge b(t) = 0 \end{cases}$$

VI. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements thereof. Such identifiers are merely provided for convenience in reading, and should not necessarily be construed as requiring or implying a particular order of steps, or a particular sequential relationship among the claim elements.

What is claimed is:

1. A method for estimating pixel values of pixels of displayed images, comprising:

determining a status of a pixel of a displayed image as captured by an image capture device, said determining being based on a confidence value for said pixel and a comparison of an estimated value and a direct sampling value of said pixel;

determining whether said pixel is obstructed based at least in part on said status and said confidence value, and based on whether a path of obstructed pixels exists from said pixel to an edge of said displayed image, wherein if said path of obstructed pixels exists, determining said pixel as being obstructed, and else, if said path of obstructed pixels does not exist, determining said pixel as being unobstructed;

determining whether to update a pixel value of said pixel based at least in part on said status and whether said pixel is obstructed; and repeating said determining steps for at least one other pixel of said displayed image, wherein said determining whether said pixel is obstructed includes:

determining whether said pixel is an obstruction candidate based on said status and said confidence value of said pixel, wherein said determining whether said pixel is an obstruction candidate includes:

if said confidence value is not equal to a threshold value, considering said pixel an obstruction candidate;

if said confidence value is equal to said threshold value and said estimated value is not equal to said direct sampling value, considering said pixel an obstruction candidate; and if said confidence value is equal to said threshold value and said estimated value is equal to said direct sampling value, not considering said pixel an obstruction candidate.

2. The method of claim 1, further comprising:

updating said confidence value if said pixel is not obstructed.

3. The method of claim 1, further comprising:

updating said pixel value if said pixel is not obstructed.

4. The method of claim 1, further comprising:

retaining an existing pixel value of said pixel if said pixel is obstructed.

5. The method of claim 1, wherein said determining a status includes:

initiating said determining by comparing a calibrated value of said pixel to a direct sampling value of said pixel.

6. The method of claim 1, wherein said determining a status includes:

determining whether said confidence value is equal to a threshold value;

if said confidence value is equal to said threshold value, setting said estimated value to equal said direct sampling value;

else, if said confidence value is not equal to said threshold value, comparing said estimated value to said direct sampling value; and outputting a status of said pixel.

7. The method of claim 1, wherein said determining whether said pixel is obstructed includes:

applying at least one logic rule if said pixel is an obstruction candidate.

8. The method of claim 1, further comprising:

if said estimated value of said pixel remains unchanged for a length of time longer than a threshold period, setting said confidence value for said pixel higher than if said estimated value of said pixel remains unchanged for a length of time shorter than said threshold period.

9. An apparatus for estimating pixel values of pixels of a displayed image, comprising:

a confidence analyzer module configured to output a confidence value for each pixel of a displayed image as captured by an image capture device;

a pixel status estimator module configured to determine a status of each pixel of said displayed image, said determine being based on said confidence value for each pixel and a comparison of an estimated value and a direct sampling value of each pixel;

an obstructed analyzer module configured to determine whether each pixel is obstructed based at least in part on said status and said confidence value, and based on whether a path of obstructed pixels exists from each pixel to an edge of said displayed image, wherein if said path of obstructed pixels exists, said obstructed analyzer module determines said pixel as being obstructed, and else, if said path of obstructed pixels does not exist, said obstructed analyzer module determines said pixel as being unobstructed; and a pixel value update module configured to determine whether to update a pixel value of each pixel based at least in part on said status corresponding to each pixel and whether each pixel is obstructed, wherein said obstructed analyzer module is further configured to:

if said confidence value is not equal to a threshold value, consider each pixel an obstruction candidate;

if said confidence value is equal to said threshold value and said estimated value is not equal to said direct sampling value, consider each pixel an obstruction candidate; and if said confidence value is equal to said threshold value and said estimated value is equal to said direct sampling value, not consider each pixel an obstruction candidate.

10. The apparatus of claim 9, wherein said pixel value update module is further configured to:

update said confidence value of a pixel if said pixel is not obstructed.

11. The apparatus of claim 9, wherein said pixel value update module is further configured to:

update a pixel value of a pixel if said pixel is not obstructed.

12. The apparatus of claim 9, wherein said pixel value update module is further configured to:

retain an existing pixel value of a pixel if said pixel is obstructed.

13. The apparatus of claim 9, wherein said confidence analyzer module is further configured to:

if said estimated value of a pixel remains unchanged for a length of time longer than a threshold period, set said confidence value for said pixel higher than if said estimated value of said pixel remains unchanged for a length of time shorter than said threshold period.

14. A computer-readable medium, comprising logic instructions that, when executed:

determine a status of a pixel of a displayed image captured by an image capture device, said determine being based on a confidence value for said pixel and a comparison of an estimated value and a direct sampling value of said pixel;

determine whether said pixel is obstructed based at least in part on said status and said confidence value, and based on whether a path of obstructed pixels exists from said pixel to an edge of said displayed image, wherein if said path of obstructed pixels exists, determine said pixel as being obstructed, and else, if said path of obstructed pixels does not exist, determine said pixel as being unobstructed;

determine whether to update a pixel value of said pixel based at least in part on said status and whether said pixel is obstructed; and repeat said logic instructions to determine for at least one other pixel of said displayed image, wherein said logic instructions to determine whether said pixel is obstructed include logic instructions that, when executed:

if said confidence value is not equal to a threshold value, consider said pixel an obstruction candidate;

if said confidence value is equal to said threshold value and said estimated value is not equal to said direct sampling value, consider said pixel an obstruction candidate; and if said confidence value is equal to said threshold value and said estimated value is equal to said direct sampling value, do not consider said pixel an obstruction candidate.

15. The computer-readable medium of claim 14, further comprising logic instructions that, when executed:

update said confidence value if said pixel is not obstructed.

16. The computer-readable medium of claim 14, wherein said logic instructions to determine whether to update a pixel value include logic instructions that, when executed:

update said pixel value if said pixel is not obstructed.

17. The computer-readable medium of claim 14, wherein said logic instructions to determine whether to update a pixel value include logic instructions that, when executed:

retain an existing pixel value of said pixel if said pixel is obstructed.

18. The computer-readable medium of claim 14, further comprising logic instructions that, when executed:

if said estimated value of said pixel remains unchanged for a length of time longer than a threshold period, set said confidence value for said pixel higher than if said estimated value of said pixel remains unchanged for a length of time shorter than said threshold period.

* * * * *

UNITED STATES PATENT AND TRADEMARK OFFICE

CERTIFICATE OF CORRECTION

PATENT NO. : 7,555,164 B2
APPLICATION NO. : 11/021754
DATED : June 30, 2009
INVENTOR(S) : I-Jong Lin It is certified that error appears in the above-identified patent and that said Letters Patent is hereby corrected as shown below:

In column 3, line 1, delete "nonconformities" and insert -- nonuniformities --, therefor.

Signed and Sealed this

Fifth Day of January, 2010

David J. Kappos

David J. Kappos
*Director of the United States Patent and Trademark Office*